United States Patent [19]
Ventimiglia et al.

[11] Patent Number: 4,800,116
[45] Date of Patent: Jan. 24, 1989

[54] DIP MOLDING PROCESS AND ARTICLE

[75] Inventors: Joseph J. Ventimiglia; Neville F. Vatcha, both of St. Louis, Mo.

[73] Assignee: Sinclair and Rush, Inc., St. Louis, Mo.

[21] Appl. No.: 10,207

[22] Filed: Feb. 3, 1987

Related U.S. Application Data

[63] Continuation of Ser. No. 706,152, Feb. 27, 1985, abandoned.

[51] Int. Cl.⁴ .................. B29C 67/22; B29C 41/14; B29C 41/22
[52] U.S. Cl. ................................ 428/215; 264/46.4; 264/254; 264/255; 264/DIG. 60; 428/318.6; 428/319.7
[58] Field of Search ............. 264/46.4, 45.5, DIG. 60, 264/254, 255, 257, 259, 241; 428/215, 318.6, 319.7

[56] References Cited

U.S. PATENT DOCUMENTS

| | | | |
|---|---|---|---|
| 2,962,738 | 12/1960 | Andrade et al. | 264/DIG. 60 |
| 3,494,989 | 2/1970 | Le May | 264/46.4 |
| 3,904,720 | 9/1975 | Sjostrand | 264/45.5 |
| 4,344,303 | 8/1982 | Kelly, Jr. | 62/530 |

OTHER PUBLICATIONS

*Waittington's Dictionary of Plastics* by Lloyd R. Waittington, Stamford Conn., Techanomie, c1968, Preface; pp. 59, 60, 113, 114 and 115.

Primary Examiner—Philip Anderson
Attorney, Agent, or Firm—Gravely, Lieder & Woodruff

[57] ABSTRACT

A dip molding process for making an integral article having a solid inner surface and a foamed outer cover in which a hot mold is dipped into a solid plastisol which is partially fused before being dipped into a foamable plastisol which is then formed, fused and bonded to the solid plastisol to form an integral article.

9 Claims, 1 Drawing Sheet

U.S. Patent
Jan. 24, 1989
4,800,116
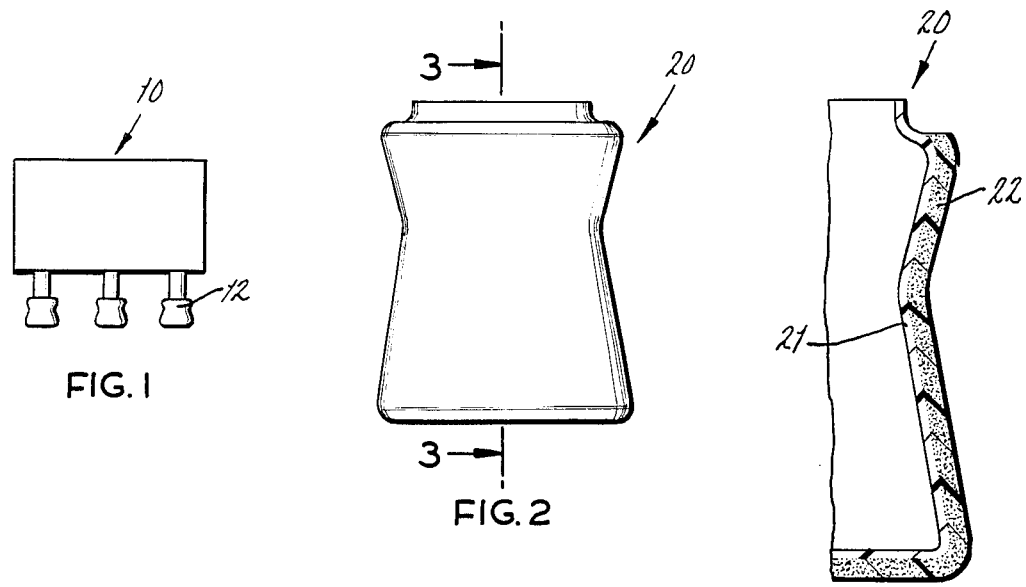
FIG. 1
FIG. 2
FIG. 3
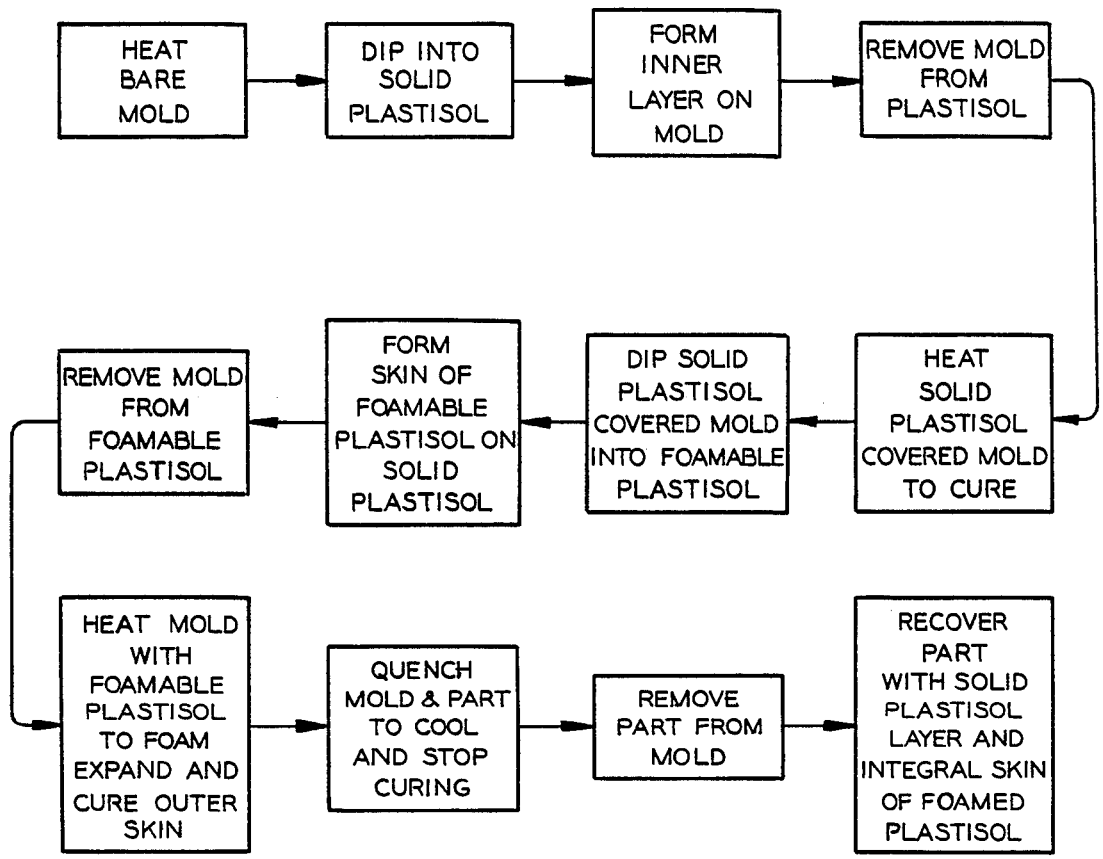
FIG. 4

DIP MOLDING PROCESS AND ARTICLE

This is a continuation of co-pending application Ser. No. 706,152 filed on Feb. 27, 1985; now abandoned.

BACKGROUND OF THE INVENTION

This invention relates to the field of hot dip molding and specifically relates to a process for making a composite dip molded article having a first part of a solid plastisol and a second integral skin of a chemically blown plastisol.

We are aware of Kelly U.S. Pat. No. 4,344,303 which discloses a laminated plastic cooling device in which a flexible insulating layer, which may be of a cellular structure, is provided with cavities filled with a freezable gel and a flexible plastic liner is attached by adhesive bonding, heat welding or sonic welding. The foam rubber layer is described as being extruded, cast or molded in a conventional manner.

In the present invention we utilized a conventional dip molding process to form an integral article having one layer of solid plastic and an attached integral layer of foamed polymer. Conventionally, when using a hot dipping process, a heated mandrel is dipped into a plastisol so that the heat from the mandrel causes the surrounding plastisol to gel on the mandrel. The mandrel is then withdrawn from the plastisol at a slow steady rate to prevent runs and drips. The mandrel with the partially gelled plastisol thereon is then post-baked in a forced air oven or in a bath of molten salt or other noncompatible oils to fuse the plastisol. After a predetermined time the mandrel is taken out of the post-bake medium and either air cooled or water cooled after which the plastisol part is stripped from the mandrel.

The foregoing process is very satisfactory for a solid polymer part but when this process is utilized with a chemically blown plastisol foam, the finished part is unacceptable from an esthetic and functional standpoint. A part made in this fashion from a chemically blown plastisol has craters and blister marks on the inside, that is, the side touching the mold, and similar defects on the outside surface. These defects are caused by excess heating or uneven heating caused by the foam development, dirty mandrel, etc., and is not a commercially feasible process. In addition, a part made this way is very flimsy and soft and has very little "body".

Accordingly, one of the principal objects of the present invention is to provide a process for making an integral article by a hot dipping process, which article has a solid plastic layer and a foamed plastic skin.

A further object is to provide a process of dip molding using two types of plastisol, the first of which is a solid type and the second of which is a physically blown foam type. It is still another object to provide an integral plastisol object having a solid layer and a chemically bonded foamed skin. These and other objects and advantages will become apparent hereinafter.

The present invention comprises a process for hot dip molding in which the mandrel is heated, dipped into a solid plastisol, and while still hot the plastisol covered mandrel is dipped into a second compatible plastisol which contains a chemical blowing agent and the resultant product is fused and foamed to form an integral object having a solid polymer layer and a foamed polymer layer.

DESCRIPTION OF THE DRAWINGS

In the drawings where like numbers refer to like parts wherever they occur.

FIG. 1 is a representation of a mandrel;

FIG. 2 is a side elevational view of an object formed from the mandrel shown in FIG. 1;

FIG. 3 is a fragmentary sectional view taken along line 3—3 of FIG. 2; and

FIG. 4 is a schematic flow diagram of the process embodied in the present invention.

DETAILED DESCRIPTION

FIG. 1 shows a mold mandrel 10 which contains a body portion 11 and a series of mandrels 12 attached thereto. The mandrels 12 have the shape of the objects to be molded, and FIGS. 2 and 3 show a typical part formed according to the present invention. The part 20 shown is an insulating receptacle for a beer or soda can and comprises an inner layer 21 of solid plastisol and an outer layer 22 of chemically blown foam plastisol. The layers are generally similar and are physically bonded together into an integral unit.

In the process of this invention as illustrated in the flow diagram shown in FIG. 4, the mold mandrel 10 first is heated preferably to a temperature of about 340° F. to about 380° F., and then dipped into a vat of plastisol which does not contain a blowing agent. A typical such plastisol is polyvinylchloride which is commercially available from many sources.

The heated mandrel is allowed to remain in the plastisol for about 5 to about 15 seconds, whereby the plastisol partially gels on the mandrel to a thickness of about 0.030 to about 0.060 inches. The mandrel then is slowly and carefully withdrawn from the plastisol so as to minimize dripping and running of the plastisol which could form an imperfect outer surface which would not fuse at a uniform rate. The plastisol covered mandrel then is partially cured at a temperature of about 350° F. to about 450° F. for about 0 to about 180 seconds. The hot plastisol covered mandrel then is inserted into a second vat containing plastisol having a chemical blowing agent incorporated therein. A typical such plastisol is polyvinylchloride with chemical blowing agent. Suitable blowing agents include ABFA (1,1'-azo bisformamide), and OBSH [P,P' oxybis (benzenesulfonyl hydrazine)]. The blowing agent preferably is heat activated. These plastisols with blowing agent incorporated are available commercially from many sources, or the product can be fabricated at the plant site from plastisol and blowing agent.

The mandrel is retained in the second plastisol vat for about 5 to about 30 seconds until a layer of plastisol of about 0.020 to about 0.080 inches in thickness is coated thereon.

The mandrel then is withdrawn from the second plastisol vat and post-baked at a temperature of about 430° F. to about 480° F. for a time of about 600 to about 1200 seconds. This causes the plastisol to partially gel and foam and expand to a thickness from about 0.125 to about 0.350 inches. It also fuses or unites physically with the solid plastisol layer into an integral unit. This chemical bonding occurs because the solid plastisol is only partially gelled and reacts with the plastisol containing foaming agent to fuse and form a unitary part. Since the solid plastisol unit has a uniformly clean surface, the second foaming layer containing plastisol gels uniformly without hot or cold spots and forms a smooth, uniform outer surface after the gelation is completed "and the two layers are fused together".

The final step is to cool the in air or water and then strip the finished part from the mandrel for storage or packing.

In addition to the indicated use as an insulator for beverage cans, this invention is useful for making soft grips for tool handles, bicycle handles, thermos bottle jackets, etc.

This invention is intended to cover all modifications and improvements to the invention described and claimed.

What is claimed is:

1. A hot dip molded composite foamed plastic part consisting of
   (a) a fused solid plstisol body portion which does not contain a blowing agent, and having a thickness of at least 30 mils, and
   (b) a fused, foamed plastisol layer of uniform composition expanded from a thickness of at least 20 mils bonded thereto and covering substantially all of said body portion, said fused, foamed plastisol layer having uniform non-blistered outer surface.

2. The part of claim 1 wherein the solid plastisol body portion is about 30-60 mils in thickness and the foamed layer is about 125-350 mils in thickness and has significant heat insulating properties.

3. The part of claim 1 wherein the foamed layer has a thickness of at least about 125 mils.

4. A process for making a composite foamed plastic part with a non-foamed inner layer and a foamed outer layer which comprises the steps of:
   (a) heating a dip mold to a temperature in the range of about 340°-380° F.;
   (b) immersing the heated dip mold into a first plastisol bath containing no blowing agent for a time sufficent to form a gel coating of the first plastisol thereon having a thickness of at least about 30 mils, and then removing the heated dip mold with the plastisol gel coating thereon from the first plastisol bath, and partially fusing the solid plastisol coating;
   (c) immersing the hot dip mold with partially fused hot solid plastisol coating thereon into a second plastisol bath containing a chemical blowing agent for a time sufficient to form a layer of the second plastisol, having a thickness of at least about 20 mils, on the partially fused solid plastisol coating and then removing the dip mold from the second plastisol bath;
   (d) heating the layer of the second plastisol and the partially fused plastisol coating at a temperature and for a time sufficient to fuse, foam and expand the layer of the second plastisol and bond the coating and layer; and then
   (e) cooling and recovering the part.

5. The process of claim 4 including the step of heating the plastisol covered mold from the first plastisol bath for a predetermined time and temperature to partially but not completely fuse the plastisol.

6. The process of claim 4 wherein the heated mandrel is allowed to remain in the first plastisol bath for about 5 to about 15 seconds to build up a coating of about 30 to about 60 mils.

7. The process of claim 6 wherein the plastisol covered mandrel is partially fused at a temperature of about 350° F. to about 450° F. for about 0 to about 180 seconds.

8. The process of claim 6 wherein the hot plastisol covered mandrel is allowed to remain in the second plastisol bath for about 5 to about 30 seconds to build up a plastisol layer of about 20 to about 80 mils.

9. The process of claim 8 whrerin the mandrel from the second plastisol bath is baked at a temperature of about 430° F. to about 480° F. for about 600 to about 1200 seconds.

* * * * *

UNITED STATES PATENT AND TRADEMARK OFFICE
CERTIFICATE OF CORRECTION

PATENT NO. : 4,800,116
DATED : January 24, 1989
INVENTOR(S) : Joseph J. Ventimiglia; Neville F. Vatcha It is certified that error appears in the above-identified patent and that said Letters Patent is hereby corrected as shown below:

Cover page, Column 2, line 5 in the Abstract, cancel "formed" and substitute therefor, "foamed".

Column 1, lines 58 and 59, cancel "chemically" and substitute therefor, "fused or physically".

Column 2, line 22, after "are" and before "physically" insert "fused or".

Column 2, line 63, cancel "chemical" and substitute therefor, "physical".

Column 3, line 2, delete the quotes (" ") from around the phrase "and the two layers are fused together".

Column 3, line 3, after "the" and before "in" insert "plastisol part".

Column 3, line 16, claim 1, delete "plstisol" and substitute therefor, "plastisol".

UNITED STATES PATENT AND TRADEMARK OFFICE
CERTIFICATE OF CORRECTION

PATENT NO. : 4,800,116

DATED : January 24, 1989

INVENTOR(S) : Joseph J. Ventimiglia et al

It is certified that error appears in the above-identified patent and that said Letters Patent is hereby corrected as shown below:

Column 4, line 34, claim 9, delete "whrerin" and substitute therefor, "wherein".

Signed and Sealed this

Twentieth Day of June, 1989

Attest:

DONALD J. QUIGG

Attesting Officer     Commissioner of Patents and Trademarks